United States Patent [19]

Akano et al.

[11] Patent Number: 4,499,754
[45] Date of Patent: Feb. 19, 1985

[54] ELECTROMAGNETIC FLOWMETER

[75] Inventors: Shinichi Akano, Honmachi; Tsutomu Goto, Tokyo; Hiroshi Watanabe, Ayase; Masato Kuroda, Fuzisawa; Sakae Ishikawa, Yokohama; Ryoichiro Matsumoto, Yokosuka, all of Japan

[73] Assignee: Yamatake-Honeywell Co., Ltd., Tokyo, Japan

[21] Appl. No.: 500,277

[22] Filed: Jun. 2, 1983

[30] Foreign Application Priority Data

Jun. 4, 1982 [JP] Japan .............................. 57-83254[U]

[51] Int. Cl.³ .............................................. G01F 1/58
[52] U.S. Cl. .................. 73/861.12; 174/78; 361/215
[58] Field of Search ........... 73/861.12, 861.14, 861.16, 73/861.17; 174/84 S, 85, 78; 361/215

[56] References Cited

U.S. PATENT DOCUMENTS

| 3,057,951 | 10/1962 | Blakely | 174/78 |
| 3,981,190 | 9/1976 | Vidmantas | 73/861.12 |
| 4,419,899 | 12/1983 | Wada | 73/861.12 |

Primary Examiner—Herbert Goldstein
Attorney, Agent, or Firm—Blakely, Sokoloff, Taylor & Zafman

[57] ABSTRACT

An electromagnetic flowmeter for electrically measuring a flow rate of a fluid flowing through a measuring pipe has an insulating lining which lines the measuring pipe. A conductive powder is mixed in parts of the insulating lining. The measuring pipe is short-circuited with the fluid through the conductive powder, thereby providing a reference potential of detected current corresponding to the flow rate of the fluid.

4 Claims, 2 Drawing Figures

ELECTROMAGNETIC FLOWMETER

BACKGROUND OF THE INVENTION

I. Field of the Invention

The present invention relates to an electromagnetic flowmeter for electrically measuring a flow rate of a fluid flowing through a measuring pipe.

II. Description of the Prior Art

In general, an electromagnetic flowmeter serves to measure a flow of a conductive fluid flowing through a measuring pipe by converting the flow rate into an electric signal using Faraday's electromagnetic induction phenomenon. A conventional electromagnetic flowmeter is constructed as follows. The electromagnetic flowmeter of this type has a measuring pipe formed midway along a main pipe through which a fluid to be measured flows. The measuring pipe is coupled to the main pipe through flanges thereof. An insulating lining which is made of a fluorine-contained polymer such as Teflon (trademark) is formed inside (or lined inside) the measuring pipe. A pair of saddle-shaped exciting coils are wound around at two sides of the measuring pipe so as to oppose each other. These exciting coils are held by a core and a housing. When the exciting coils are excited, a magnetic field is generated such that its magnetic flux crosses perpendicularly the flow of the fluid flowing through the measuring pipe. A pair of electrodes are arranged to be perpendicular to both the flow of the fluid and the magnetic flux and are connected to terminals through lead wires. These electrodes are insulated from the measuring pipe and respectively extend through wall portions of the measuring pipe such that their distal ends are slightly exposed inside the measuring pipe.

When the fluid flows through the measuring pipe, the coils are excited. A magnetic field is generated such that its magnetic flux crosses perpendicularly the flow of the fluid. The direction of the fluid flow, the direction of magnetic flux, and the direction of the arrangement of electrodes are perpendicular to each other. An electromotive force which is proportional to the average velocity of the fluid flow is generated across the electrodes in accordance with Faraday's law. The electromotive force is supplied to and amplified by an amplifier to generate a signal indicating the flow rate, thereby allowing control of the flow rate to be constant.

FIG. 1 is a sectional view showing the coupling condition between a measuring pipe 1 of a conventional electromagnetic flowmeter and a main pipe 3. A flange 2a of an insulating lining 2 which lines the measuring pipe 1 contacts the outer surface of a flange 1a of the measuring pipe 1. The flange 2a and a flange 3a of the main pipe 3, respectively, are coupled through a pair of gaskets 4 and a ground ring 5 interposed therebetween. The flange 1a is connected to the ground ring 5 via a cord 6. The ground ring 5 serves to hold the potential of the fluid flowing through the main pipe 3 and the measuring pipe 1 to be the same as that of the electromagnetic flowmeter as a whole. This potential corresponds to a reference potential of a detected current measured by the flowmeter. On the other hand, a pair of electrodes are insulated from each other between the measuring pipe 1 and the fluid. It should be noted that the measuring pipe 1 is not insulated from the flowmeter body. For this reason, the ground ring 5 must be connected to the flange 1a through the cord 6.

As may be apparent from the above description, the conventional electromagnetic flowmeter requires the ground ring 5 and the two gaskets 4, resulting in cumbersome, time-consuming piping and wiring procedures. Furthermore, the fluid tends to leak from the coupled portion, resulting in inconvenience.

SUMMARY OF THE INVENTION

The present invention has been made in consideration of the situation described above, and has for its object to provide an electromagnetic flowmeter wherein a conductive powder is mixed in part of an insulating lining which lines the measuring pipe through which a fluid to be measured flows, so as to short-circuit the measuring pipe with the fluid, thereby simplifying a coupling structure and providing easy pipework.

In order to achieve the above and other objects of the present invention, there is provided an electromagnetic flowmeter for electrically measuring a flow rate of a fluid flowing through a measuring pipe coupled to a main pipe in a first direction through flanges of said measuring and main pipes, comprising:

a pair of exciting coils for generating a magnetic flux in a second direction perpendicular to the first direction in response to a flow of the fluid;

a pair of electrodes for generating an electromotive force in response to the magnetic flux generated by said pair of exciting coils, the electromotive force being generated in a third direction perpendicular to both the first and second directions;

a housing mounted on said measuring pipe so as to house said pair of exciting coils;

an insulating lining which lines said measuring pipe and which has conductive portions, said insulating lining also having flanges which are respectively joined to outer surfaces of the flanges of said measuring pipe;

a conductive powder mixed in an insulating material to constitute said conductive portions of said insulating lining; and a gasket sandwiched between each of the flanges of said insulating lining which respectively serve as said conductive portions and a corresponding one of the flanges of said main pipe;

wherein said measuring pipe and said housing are short-circuited with the fluid, thereby providing a reference potential of a detected current corresponding to the flow rate of the fluid.

DETAILED DESCRIPTION OF THE PREFERRED EMBODIMENT

Figure 1:
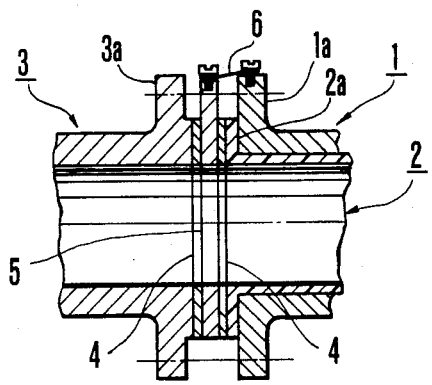
FIG. 1 is a sectional view of a coupling between a conventional electromagnetic flowmeter and a main pipe.
Figure 2:
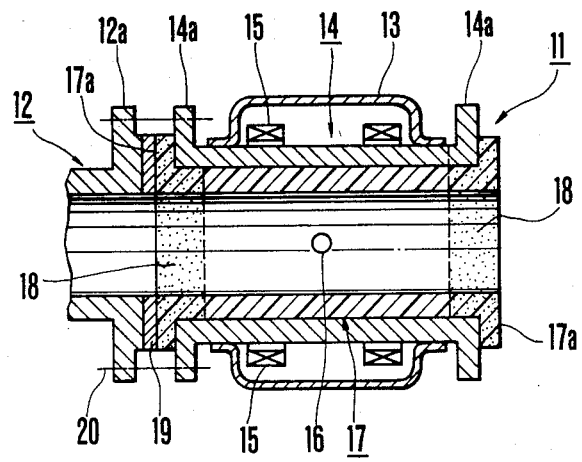
FIG. 2 is a sectional view of an electromagnetic flowmeter according to an embodiment of the present invention.

FIG. 2 is a sectional view of an electromagnetic flowmeter according to an embodiment of the present invention. An electromagnetic flowmeter 11 is formed midway along a main pipe 12 through which a fluid to be measured flows. A measuring pipe 14 of the electromagnetic flowmeter 11 is coupled to the main pipe 12 through flanges 12a and 14a thereof. More particularly, the flanges 14a are formed integrally at the two respective ends of the measuring pipe 14 and extend outward from a housing 13. A pair of saddle-shaped exciting coils 15 are wound around at opposing sides of the measuring pipe 14 through a core (not shown) and a support (not shown) to oppose each other. A pair of electrodes 16 are disposed at a center along the axial direction of the measuring pipe 14 to oppose each other and to be perpendicular to both the direction of fluid flow and the direction of the magnetic flux produced by the exciting coils 15. These electrodes 16 are insulated from the measuring pipe 14 and respectively extend through wall portions of the measuring pipe 14 such that their distal ends are slightly exposed to the fluid flowing in the measuring pipe 14. The electrodes 16 are connected to terminals in the housing 13 through respective lead wires (not shown).

An insulating lining 17 made of a synthetic resin such as fluorine-contained polymers, for example Teflon (trademark), lines the measuring pipe 14. Flanges 17a of the insulating lining 17 are formed integrally with the measuring pipe 14 so as to extend from the two ends thereof. The flanges 17a are thus joined to the outer surfaces of flanges 14a of the measuring pipe 14, respectively. A conductive carbon powder 18 is mixed in with the insulating lining 17 at the two ends thereof and at adjacent portions thereof at the time of molding. The electrodes 16 respectively extend through wall portions of the measuring pipe 14 and the insulating lining 17 such that the distal ends of the electrodes 16 are slightly exposed to contact the fluid. In the elctromagnetic flowmeter 11 of this structure, each flange 17a is bolted to a corresponding flange 12a (only one flange is illustrated in FIG. 2) through a corresponding gasket 19. The measuring pipe 14 and the fluid are grounded through the carbon powder 18.

The insulating lining 17 is molded as follows. The measuring pipe 14 is clamped by a split-cavity mold so as to align the longitudinal direction of the measuring pipe 14 with the vertical direction. A core is then placed in the measuring pipe 14. The core has an outer diameter corresponding to an inner diameter of the insulating lining 17. A synthetic resin melt containing the carbon powder 18 of 40 weight % is injected from the upper opening of the split-cavity mold in a predetermined amount. Subsequently, a synthetic resin melt which does not contain the carbon powder 18 is injected into the cavity in a predetermined amount. Finally, a synthetic resin melt containing the carbon powder 18 of 40 weight % is again injected into the cavity in a predetermined amount. After the melt is hardened, the split-cavity mold and the core are removed, thereby obtaining the measuring pipe lined with the conductive layer.

In operation, when the exciting coils 15 of the electromagnetic flowmeter are excited, a magnetic field is generated such that its magnetic flux crosses perpendicularly the fluid flow in the measuring pipe 14. An electromotive force is generated across the electrodes in accordance with Faraday's law since these electrodes are disposed to be perpendicular to both the direction of fluid flow and the direction of the magnetic flux. The electromotive force is delivered to an amplifier through the lead wires and the terminals. The amplifier then amplifies the electromotive force to generate a signal indicating the measured flow rate. In accordance with the measured flow rate, constant flow rate control, for example, may be performed. In this case, the flowmeter body such as the measuring pipe 14 and the housing 13 formed integrally therewith is short-circuited with the fluid by the carbon powder 18 mixed in with the insulating lining 17 at the two ends thereof. As a result, a potential over the entire flowmeter 11 becomes equal to a potential of the fluid. This potential serves as the reference potential of a detected current measured by the flowmeter 11.

While in the foregoing embodiment fluorine-contained polymer resin has been used as an insulating material for the insulating lining 17, the same effects may be expected by using thermosetting resin such as phenol resin. polyester resin, epoxy resin or chloroprene resin. In addition, the conductive powder to be mixed with the insulating lining 17 for formation of the conductive portion in part of the insulating lining 17 is not limited to carbon but it may obviously be of other metallic powder such as of copper or aluminum. For example, copper powder may be compatible with the chroloprene resin.

In summary, according to the electromagnetic flowmeter of the present invention, a conductive powder is mixed at parts of the insulating lining which lines the measuring pipe, so that the flowmeter main body is short-circuited with the fluid to be measured, thereby obtaining the reference potential. In addition to this advantage, the conventional ground ring is eliminated and the related connections need not be performed. Furthermore, only one gasket is used for each coupling, so that the electromagnetic flowmeter can be easily joined with the main pipe and leakage at the coupling can be prevented.

What is claimed is:

1. An electromagnetic flowmeter for electrically measuring a flow rate of a fluid flowing through a measuring pipe coupled to a main pipe in a first direction through flanges of said measuring and main pipes, comprising:
   a pair of exciting coils for generating a magnetic flux in a second direction perpendicular to the first direction in response to a flow of the fluid;
   a pair of electrodes for generating an electromotive force in response to the magnetic flux generated by said pair of excitation coils, the electromotive force being generated in a third direction perpendicular to both the first and second directions;
   a housing mounted on said measuring pipe so as to house said pair of exciting coils;
   an insulating lining which lines said measuring pipe and which has conductive portions, said insulating lining also having flanges which are respectively joined to outer surfaces of the flanges of said measuring pipe;
   a conductive powder mixed in an insulating material to constitute said conductive portions of said insulating lining; and
   a gasket sandwiched between each of the flanges of said insulating lining which respectively serve as said conductive portions and a corresponding one of the flanges of said main pipe;
   wherein said measuring pipe and said housing are short-circuited with the fluid, thereby providing a reference potential of a detected current corresponding to the flow rate of the fluid.

2. A flowmeter according to claim 1, wherein said insulating lining is made of synthetic resin selected from the group of fluorine-contained polymer resin, phenol resin, polyester resin, epoxy resin and chloroprene resin.

3. A flowmeter according to claim 1, wherein said conductive powder comprises a conductive carbon powder.

4. A flowmeter according to claim 1, wherein said insulating lining is molded using a combination of a split-cavity mold and a core.

* * * * *